Patented Apr. 9, 1946

2,397,960

UNITED STATES PATENT OFFICE 2,397,960

FOOD ANTIOXIDANTS

Myers F. Gribbins and Frederick W. Miller, Jr., Wilmington, Del., and Daniel K. O'Leary, Kennett Square, Pa., assignors to E. I. du Pont de Nemours & Company, Wilmington, Del., a corporation of Delaware No Drawing. Application August 28, 1944, Serial No. 551,624

17 Claims.  (Cl. 99—163)

This invention relates to the stabilization of edible animal, vegetable, or fish oils, fats and waxes, and more particularly to the stabilization of fatty glycerides with substituted beta mercaptopropionic acids or esters.

It is well known that vegetable, animal, and fish oils, fats and waxes tend to become rancid and discolor after storage. It is not definitely known just what causes the deterioration but it has been suggested that it may be due to oxidation or to minute amounts of impurities. Such deterioration is highly objectionable and renders the fats and oils unfit for many uses. Many attempts have been made to overcome this deterioration, the addition of various substances to the fats and oils having been proposed to inhibit or retard it. Among the suggested substances have been the aromatic amino compounds, halides such as zinc chloride, salts such as sodium silicate, phenylates, and sulfocarbolates, and the like. These substances have, for various reasons, not proven to be entirely satisfactory, many of them, for example, being too expensive, too volatile, discolor the fats and oils, are toxic, or give products having an objectionable odor or taste.

An object of the present invention is to provide stabilized edible vegetable, animal, and fish oils, fats, and waxes. Another object is to provide compounds to be incorporated in fatty substances which will retard or inhibit their deterioration or prolong the period during which the fatty material is not rancid, which period is commonly referred to as the induction period, and which are free from the disadvantageous properties of compounds heretofore employed for this purpose. Still another object is to provide substituted beta mercaptopropionic acids and their esters as rancidity inhibitors. Other objects and advantages of the invention will appear hereinafter.

These objects may be accomplished in accordance with the invention by stabilizing edible vegetable, animal, and fish oils, fats, and waxes against rancidity by the incorporation therein of substituted beta mercaptopropionic acids or esters, by which we mean compounds containing the group ROOCCH$_2$CH$_2$S—X in which R is hydrogen, an alkyl, aryl, aralkyl or alicyclic group and in which the monovalent substituent "—X" of the sulfur group is:

1. A hydrocarbon group such e. g. as: the alkyl groups: methyl, ethyl, propyl, butyl, lauryl, and the aryl groups: phenyl, naphthyl, benzyl; and such groups as p methoxy phenyl, p hydroxy phenyl and cyclohexyl, which gives respectively:

a. 3-methyl mercaptopropionic acid
b. 3-ethyl mercaptopropionic acid
c. 3-propyl mercaptopropionic acid
d. 3-butyl mercaptopropionic acid
e. 3-lauryl mercaptopropionic acid
f. 3-phenyl mercaptopropionic acid
g. 3-benzyl mercaptopropionic acid
h. 3-naphthyl mercaptopropionic acid
i. 3-(p methoxy) phenyl mercaptopropionic acid
j. 3-(p-hydroxy) phenyl mercaptopropionic acid
k. 3-cyclohexyl mercaptopropionic acid Compounds of this type may be prepared by the addition of mercaptans to acrylonitrile followed by acid or alkaline hydrolysis of the nitrile group to produce the desired product.

EXAMPLE: 3-ETHYLMERCAPTOPROPIONIC ACID PREPARATION 62 parts (1M) ethyl mercaptan is reacted with 53 parts (1M) acrylonitrile in the presence of 1 part piperidine (catalyst). This is an exothermic reaction and cooling is necessary. After 2 hours, the reaction mixture is distilled to isolate the addition product which distills at 94° C./11 mm. An 80% yield is obtained. Hydrolysis of the nitrile group is accomplished by heating the compound in an excess of concentrated HCl (Ca 200 parts) for 1 hour. The by-product NH$_4$Cl precipitates out and is removed by filtration. Fractional distillation of the filtrate gives the desired product.

3-ethyl mercaptopropionic acid properties:

Formula: CH$_3$CH$_2$—S—CH$_2$CH$_2$COOH
Molecular wt.: 134
Boiling point: 93° C./2 mm.
Neutral equivalent: 134
Solubility in water 20° C.: slightly soluble
Solubility in fats 20° C.: fairly soluble
Appearance: water white liquid In a similar manner 3-benzyl mercaptopropionic acid can be prepared from benzyl mercaptan and acrylonitrile.

3-benzyl mercaptopropionic acid properties:

Formula: C$_6$H$_5$CH$_2$—S—CH$_2$CH$_2$COOH
Molecular wt.: 196
M. P.: 81–82° C.
Neutral equivalent: 196
Solubility in water 20° C.: fairly soluble
Appearance: odorless white crystals 2. An oxygenated-hydrocarbon group such e. g. as: the alcohol groups: hydroxymethyl, hydroxyethyl, and hydroxybutyl; the ether groups:

methoxymethyl, methoxyethyl, and ethoxyethyl; the acid groups: carboxymethyl, carboxyethyl, carboxypropyl and carboxybutyl; the aldehyde groups such as aldehydoethyl, which gives respectively:

a. 3-hydroxymethyl mercaptopropionic acid

HOOCCH₂CH₂SCH₂OH b. 3-hydroxyethyl mercaptopropionic acid

HOOCCH₂CH₂SCH₂CH₂OH c. 3-hydroxypropyl mercaptopropionic acid

HOOCCH₂CH₂SCH₂CH₂CH₂OH d. 3-methoxymethyl mercaptopropionic acid

HOOCCH₂CH₂SCH₂OCH₃ e. 3-methoxyethyl mercaptopropionic acid

HOOCCH₂CH₂SCH₂CH₂OCH₃ f. 3-ethoxyethyl mercaptopropionic acid

HOOCCH₂CH₂SCH₂CH₂OC₂H₅ g. 3-carboxymethyl mercaptopropionic acid

HOOCCH₂CH₂SCH₂COOH h. 3-carboxethyl mercaptopropionic acid (beta-beta thio-dipropionic acid)

HOOCCH₂CH₂SCH₂CH₂COOH i. 3-carboxypropyl mercaptopropionic acid

HOOCCH₂CH₂SCH₂CH₂CH₂COOH j. 3-carboxybutyl mercaptopropionic acid

HOOCCH₂CH₂SCH₂CH₂CH₂CH₂COOH k. 3-aldehydoethyl mercaptopropionic acid

HOOCCH₂CH₂SCH₂CH₂CHO

The type reaction is identical to that indicated in Section 1. Specifically, oxygenated mercaptans are added to acrylonitrile and the nitrile group hydrolyzed by acid or alkaline treatment.

EXAMPLE: 3-HYDROXYETHYL MERCAPTOPROPIONIC ACID PREPARATION 27 parts (0.35M) mercapto glycol (HSCH₂CH₂OH)

is added to 19 parts (0.35M) of acrylonitrile in the presence of 0.5 parts piperidine. The reaction mixture is "topped" to remove unreacted materials and then heated in an excess of concentrated HCl (75 parts) for 1 hour. The by-product NH₄Cl precipitates out and is removed by filtration. Excess HCl and H₂O are removed by vacuum treatment. The product,

HOCH₂CH₂SCH₂CH₂COOH is a water white, thick liquid which decomposes on distillation. Neutral equivalent=150.

3. A sulfur-hydrocarbon group such e. g. as: mercaptoethyl, mercaptopropyl, mercaptobutyl, mercaptoisobutyl, mercaptohexyl and ethiaethyl, which gives respectively:

a. 3-mercaptoethyl mercaptopropionic acid

HOOCCH₂CH₂SCH₂CH₂SH b. 3-mercaptopropyl mercaptopropionic acid

HOOCCH₂CH₂SCH₂CH₂CH₂SH c. 3-mercaptobutyl mercaptopropionic acid

HOOCCH₂CH₂SCH₂CH₂CH₂CH₂SH d. 3-mercaptoisobutyl mercaptopropionic acid

HOOCCH₂CH₂SCH₂CH₂CHSH
|
CH₃ e. 3-mercaptohexyl mercaptopropionic acid

HOOCCH₂CH₂SC₆H₁₂SH f. ethiaethyl mercaptopropionic acid

HOOCCH₂CH₂SCH₂CH₂SC₂H₅

The type reaction is identical to that indicated in Section 1. Specifically, it involves the addition of molar amounts of dimercaptans to acrylonitrile, followed by acid or alkaline hydrolysis of the nitrile group.

EXAMPLE: 6-MERCAPTO-4-THIAHEXANOIC ACID PREPARATION

To a solution of 329 parts (3.5M) ethanedithiol and 2 parts piperidine in 450 parts ethyl alcohol, 185.5 parts (3.5M) acrylonitrile is added dropwise over a period of 1 hour. Reaction temperature is maintained between 40–50° C. A precipitate of the di-addition product forms and is removed by filtration. Distillation of the filtrate gives the desired product HSCH₂CH₂SCH₂CH₂CN boiling point 139–141° C./6 mm. in about 26% yield. Heating 20 parts of this nitrile in 75 parts concentrated HCl for 2 hours (in steam bath) produces the final product, a light yellow liquid, boiling point 142–143° C./2 mm. Neutral equivalent=166.

4. A sulfur- and oxygenated-hydrocarbon group such e. g. as:

carboxyethiaethyl,

—CH₂CH₂SCH₂CH₂COOH carboxyethiaethdithiaethyl,

—CH₂CH₂SSCH₂CH₂SCH₂CH₂COOH carboxyethiaisobutyl,

—CH₂CH₂CH(CH₃)SCH₂CH₂COOH and
carboxyethiapropyl,

—CH₂CH₂CH₂SCH₂CH₂COOH which gives respectively:

a. 4,7-dithiasebacic acid

HOOCCH₂CH₂S—CH₂CH₂SCH₂CH₂COOH b. 4,7,8,11-tetraethiatetradecandoic acid

HOOCCH₂CH₂S—CH₂CH₂SSCH₂CH₂SCH₂CH₂COOH c. 5 methyl-4,8-dithiaundecandioic acid

HOOCCH₂CH₂SCH₂CH₂CH(CH₃)SCH₂CH₂COOH d. 4,11-dithiatetradecanedioic acid

HOOCCH₂CH₂S(CH₂)₆SCH₂CH₂COOH

Type reaction is identical to that indicated in Section 1. Specifically, it involves the addition of 2 moles acrylonitrile and 1 mole of a dimercaptan to give a sulfur containing dinitrile which can be hydrolyzed by acid or alkaline treatments.

EXAMPLE: 4,7-DITHIASEBACIC ACID PREPARATION

To a solution of 94 parts (1M) ethanedithiol and 1 part piperidine in 308 parts ethyl alcohol, 106 parts (2M) acrylonitrile is added dropwise over a period of 1 hour. Reaction temperature is maintained between 40–50° C. The dinitrile addition product (CH₂S—CH₂CH₂CN)₂ precipitates out on cooling and is removed by filtration. It is easily recrystallized from hot 99% methanol. This dinitrile is reacted with 300 parts concentrated HCl for 1 hour (steam bath), during which the desired product, 4,7-dithiasebacic acid is formed and precipitates out.

4,7-dithiasebacic acid properties:

Formula:

HOOCCH₂CH₂-S-CH₂CH₂-S-CH₂CH₂COOH

Molecular wt.: 236
M. P.: 151° C.
Neutral equivalent: 118
Solubility in water 20° C.: very slightly soluble
Solubility in fat 20° C.: slightly soluble
Appearance: odorless white crystals 5. Or a sulfur-, nitrogen-hydrocarbon group such e. g. as: 3-benzothiazyl mercaptopropionic acid

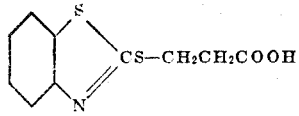

EXAMPLE: 3-BENZOTHIAZYL MERCAPTOPROPIONIC ACID PREPARATION

To a solution of 167 parts (1M) mercaptobenzothiazol and 112 parts (2.0M) KOH in 600 parts dioxane at 50° C., 108 parts (1.0M) beta-chloropropionic acid is added dropwise over a period of 1-2 hours. The mixture is then heated at steam bath temperature for 2 hours, after which the dioxane is removed under reduced pressure. The thick slurry is then added to 600 parts water containing 2 moles HCl to precipitate the desired product and unreacted mercaptobenzothiazol. Twice recrystallization of this material from hot 99% methanol gives pure 3-benzothiazyl mercaptopropionic acid.

3-benzothiazyl mercaptopropionic acid properties:

Formula:

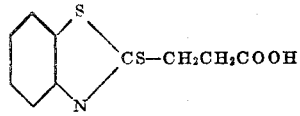

Molecular wt.: 239
M. P.: 149–150° C.
Neutral equivalent: 239
Solubility in water 20° C.: slightly soluble
Solubility in fats 20° C.: slightly soluble
Appearance: white crystals While the above hydrocarbon, alcohol, ether, aldehyde acid and other derivatives of the beta mercaptopropionic acids are excellent inhibitors of rancidity, the esters are especially effective due to the fact that the ester is generally more readily soluble in the fats and oils. The methyl, ethyl, propyl, butyl, lauryl, myristyl, cetyl, stearyl and other straight, branch chained or cyclic esters are suitable. Furthermore, it has been determined that lactone formation between the acid and the substituent lowers the effectiveness of the inhibitors.

The surprising and unexpected rancidity inhibiting effect of the substituted beta mercaptopropionic acids or esters is clearly demonstrated by the following tests. The tests were conducted by a method generally known as the Swift test. This method is described in "Oil and Soap" 10, 105–109 (1933), in an article by A. E. King et al., "An Accelerated Stability Test Using the Peroxide Value as an Index." Briefly stated, this test involves placing the oil to be tested in a constant temperature bath and subsequently bubbling air through the oil. There follow results obtained on the treatment of various oils with representative inhibitors listed above in the Swift test. The peroxide value, as described in the above article is a measure of the degree of rancidity, each oil or fat having a fairly definite peroxide value at which it is definitely rancid.

1. Lard

| Antioxidant | Hours aeration | Peroxide value |
|---|---|---|
| None | 1½ | [1] 27 |
| Beta-beta-thio-dipropionic acid 0.025% | 11 | 12 |
| Beta-beta-thio-dipropionic acid 0.05% | 11 | 7 |
| Beta-beta-thio-dipropionic acid 0.1% | 27 | 6 |
| Beta-beta-thio-dipropionic acid 0.1% | 50 | 20 |
| Beta-beta-thio-dipropionic acid 0.25% | 51 | 3 |
| Beta-beta-thio-dipropionic acid 0.5% | 79 | 1 |

[1] Lard with peroxide value of 20 or above is rancid.

2. Soy bean oil

| Antioxidant | Hours aeration | Peroxide value |
|---|---|---|
| None | 4 | 69 |
| Do | 6 | [1] 195 |
| Beta-beta-thio-dipropionic acid 0.05% | 23 | 55 |
| Beta-beta-thio-dipropionic acid 0.1% | 43 | 6 |
| Beta-beta-thio-dipropionic acid 0.1% | 67 | 93 |

[1] This oil with a peroxide value of 195 was rancid.

3. Corn oil

| Antioxidant | Hours aeration | Peroxide value |
|---|---|---|
| None | 8 | [1] 73 |
| Beta-beta-thio-dipropionic acid 0.05% | 60 | 22 |
| Beta-beta-thio-dipropionic acid 0.1% | 125 | 33 |

[1] This oil with a peroxide value of 73 was rancid.

4. Hydrogenated shortening

| Antioxidant | Hours aeration | Peroxide value |
|---|---|---|
| None | 43 | [1] 120 |
| Beta-beta-thio-dipropionic acid 0.1% | 338 | 5 |

[1] This shortening with a peroxide value of 120 was rancid.

The ethyl, octyl and lauryl esters of thiodipropionic acid and the substituted thio monopropionic acids have also been found to be excellent antioxidants in various oils as shown by the Swift test and are generally as effective on an equal sulfur content basis.

Table I illustrates the effectiveness of a number of the substituted beta mercaptopropionic acids or esters giving the fat or oil treated the concentration of the inhibitor used and the improvement factor. The improvement factor is a ratio of the number of hours required for the treated and untreated fats, respectively, to become rancid. Under these experimental conditions, a factor of 3.0 is considered significant. In those cases showing a "+" after the improvement factor the treated fat was not rancid when the factor reacted the value indicated.

Table I

| | Fat or oil | Inhibitor | Concentration in percent | Improvement factor |
|---|---|---|---|---|
| 1 | Lard | Thiodipropionic acid | 0.10 | 10.0+ |
| 2 | Hydrogenated lard | ...do... | 0.10 | 10.0 |
| 3 | Cottonseed oil | ...do... | 0.10 | 12.0 |
| 4 | Soybean oil | ...do... | 0.10 | 13.0 |
| 5 | Corn oil | ...do... | 0.10 | 9.3 |
| 6 | Lard | Ethyl ester of | 0.10 | Ca. 10.0 |
| 7 | ...do... | Lauryl 6-hydroxy-4-thiahexanate (HOCH$_2$CH$_2$S—CH$_2$CH$_2$COO(CH$_2$)$_{11}$CH$_3$) | 0.10 | 4.0 |
| 8 | ...do... | 8-oxa-4-thiadecanoic acid (CH$_3$CH$_2$OCH$_2$CH$_2$CH$_2$—S—CH$_2$CH$_2$COOH) | 0.10 | 8.0+ |
| 9 | ...do... | 6-mercapto, 4-thiahexanoic | 0.10 | 20.2 |
| 10 | ...do... | 4,7-dithiasebacic | 0.05 | 18.7+ |
| 11 | ...do... | 5-methyl-4, 8-dithiaundecandioic | 0.10 | 25.4 |
| 12 | ...do... | 4,7,8,11-tetrathiatetradecandioic | 0.10 | 10.4 |
| 13 | ...do... | Lauryl 4, 7-dithiasebacate | 0.05 | 14.7 |
| 14 | ...do... | Octyl thio-dipropionate | 0.22 | 11.0+ |
| 15 | ...do... | Lauryl thio-dipropionate | 0.05 | 11.4 |
| 16 | ...do... | 3-methyl mercaptopropionic acid, CH$_3$—S—CH$_2$CH$_2$COOH | 0.10 | 10.0 |
| 17 | ...do... | 3-phenyl mercaptopropionic acid, C$_6$H$_5$SCH$_2$CH$_2$COOH | 0.10 | 21.0 |
| 18 | ...do... | 3-benzyl mercaptopropionic acid, C$_6$H$_5$CH$_2$SCH$_2$CH$_2$COOH | 0.10 | 220.0 |
| 19 | ...do... | Lauryl ester of 3-methyl mercaptopropionic acid, CH$_3$SCH$_2$CH$_2$COOC$_{12}$H$_{25}$ | 0.05 | 8.0 |
| 20 | ...do... | Lauryl ester of 3-ethyl mercaptopropionic acid, C$_2$H$_5$SCH$_2$CH$_2$COOC$_{12}$H$_{25}$ | 0.05 | 32.0 |
| 21 | ...do... | 3-butyl mercaptopropionic acid, CH$_3$CH$_2$CH$_2$CH$_2$—S—CH$_2$CH$_2$COOH | 0.10 | 33.0 |
| 22 | ...do... | 3-ethyl mercaptopropionic acid, CH$_3$CH$_2$—S—CH$_2$CH$_2$COOH | 0.10 | 22.0 |
| 23 | ...do... | 3-lauryl mercaptopropionic acid, CH$_3$(CH$_2$)$_{11}$SCH$_2$CH$_2$COOH | 0.10 | 43.0 |
| 24 | ...do... | 3-benzothiazyl mercaptopropionic acid 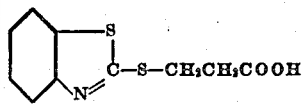 | 0.10 | 4.0+ |

During the process of rancidification, oils and fats go through an induction period in which the peroxide value increases relatively slowly. After this induction period the peroxide value increases rapidly and the addition of antioxidants usually fails to have any effect. The substituted beta mercaptopropionic acids or esters possess the unusual property of prolonging the induction period of oils if the acid or ester is added before the end of that period. This property of these agents contributes to their excellent effectiveness as an antioxidant.

A further decided advantage in the use of the substituted beta mercapto propionic acids or esters is that they possess excellent rancidity inhibiting properties in pure fats at room temperatures and above. Other agents often lack such properties at the higher temperatures, which prevents their use in applications calling for the cooking fats. To demonstrate, thin films of lard were exposed in glass dishes at room temperature, 50° C., 70° C., and 90° C.

| Temperature | Time to rancidity | |
|---|---|---|
| | Lard without antioxidant | Lard containing 0.1% thio dipropionic acid |
| 90° C | 2 hours | 70 hours |
| 70° C | 4 hours | 186 hours |
| 50° C | 17 hours | 390 hours |
| Room temperature | 5 days | 74 days |

The substituted mercapto acids and their esters have shown excellent rancidity inhibiting properties when used in the manufacture of potato chips. Chips made with lard and stored at 40° C. became rancid at the end of four days. If 0.1% of the acid is added to the lard for cooking, the chips will not become rancid for 10 days. Chips made with cottonseed oil became rancid after 9 days, but when 0.1% of the acid was added 37 days were required for the chips to become rancid. Sugar cookies prepared with lard containing about 0.1% of the dilauryl ester of thiodipropionic acid were stored at 50° C., after 26 days they became rancid as compared to cookies containing untreated lard which became rancid in 13 days. Piecrust containing lard similarly treated rancidified in 8 days while piecrust containing untreated lard rancidified in 4 days.

These rancidity inhibitors are exceptionally useful, because of their tasteless and odorless properties at the preferred concentration, in vegetable, animal, and fish oil, fat-containing foods such, for example, as lard, butter, oleomargarine, olive oil, corn oil, cod-liver oil, ice cream, mayonnaise, salad dressings, as well as products containing these materials such as pastry, cakes, crackers, cookies, bread, potato chips, doughnuts, popcorn, and the like.

The inhibitors may be added to the material being treated in any suitable manner. They may, for example, be mixed into the cold material; the material may be heated and the inhibitor then added (in this way the substituted beta mercaptopropionic acids or esters can be added with facility to fats, oils, and waxes for at elevated temperature, sufficient to melt the fat, the substituted mercapto acid or ester is easily dispersed throughout the material); or any other suitable means may be employed. It is not necessary that the inhibitor be miscible in the material treated for whether present, in the indicated amounts, as a solid or as a liquid it nevertheless inhibits rancidity.

While the preferred method of applying these inhibitors is by incorporating them into the fats, waxes or oil, they may be sprayed, properly diluted in water or in a solvent, or undiluted if desired on the surface of the product to be protected. This method of application is especially adapted to the protection of meats, bacon, salted nuts, shredded suet, fatty fish, etc.

The inhibitors may likewise be used in the sizing of paper, waxed paper or parchment paper to be used in the wrapping of fats, waxes, or oils, where there is direct contact between the product and the wrapper.

We claim:

1. A process which comprises protecting against rancidity a member of the group consisting of edible vegetable, animal, and fish oils, fats, and waxes, by incorporating therein a beta mercaptopropionic compound having the linear structural formula ROOCCH₂CH₂S—X in which R is selected from the group consisting of hydrogen and hydrocarbon groups and in which the monovalent substituent X is a member of the group consisting of hydrocarbons, oxygenated-, sulfur-, sulfur- and oxygenated-, and sulfur- and nitrogen-hydrocarbons.

2. A process which comprises protecting against rancidity a member of the group consisting of edible vegetable, animal, and fish oils, fats, and waxes, by incorporating therein a 3-hydrocarbon substituted beta mercaptopropionic acid.

3. A process which comprises protecting against rancidity a member of the group consisting of edible vegetable, animal, and fish oils, fats, and waxes, by incorporating therein a 3-alkyl beta mercaptopropionic acid.

4. A member of the group consisting of edible vegetable, animal, and fish oils, fats, and waxes, stabilized against rancidity by a beta mercaptopropionic compound having the linear structural formula ROOCCH₂CH₂S—X in which R is selected from the group consisting of hydrogen and hydrocarbon groups and in which the monovalent substituent X is a member of the group consisting of hydrocarbons, oxygenated-, sulfur-, sulfur- and oxygenated-, and sulfur- and nitrogen-hydrocarbons.

5. A process which comprises protecting against rancidity the oxygen-exposed surfaces of a member of the group consisting of edible vegetable, animal, and fish oils, fats and waxes by the treatment of said surfaces with a beta-mercaptopropionic compound having the linear structural formula ROOCCH₂CH₂S—X in which R is selected from the group consisting of hydrogen and hydrocarbon groups and in which the monovalent substituent X is a member of the group consisting of hydrocarbons, oxygenated-, sulfur-, sulfur- and oxygenated-, and sulfur- and nitrogen-hydrocarbons.

6. A fat-containing product, the fat content of which has been fortified against rancidity by a beta mercaptopropionic compound having the linear structural formula ROOCCH₂CH₂S—X in which R is selected from the group consisting of hydrogen and hydrocarbon groups and in which the monovalent substituent X is a member of the group consisting of hydrocarbons, oxygenated-, sulfur-, sulfur- and oxygenated-, and sulfur- and nitrogen-hydrocarbons.

7. A process which comprises protecting against rancidity a member of the group consisting of edible vegetable, animal, and fish oils, fats, and waxes, by incorporating therein a 3-lauryl mercaptopropionic acid.

8. A member of the group consisting of edible vegetable, animal, and fish oils, fats, and waxes, stabilized against rancidity by 3-lauryl mercaptopropionic acid.

9. A process which comprises protecting against rancidity a member of the group consisting of edible vegetable, animal, and fish oils, fats and waxes, by incorporating therein a 3-aryl substituted beta-mercaptopropionic acid.

10. A process which comprises protecting against rancidity a member of the group consisting of edible vegetable, animal, and fish oils, fats, and waxes, by incorporating therein a 3-benzyl mercaptopropionic acid.

11. A member of the group consisting of edible vegetable, animal, and fish oils, fats, and waxes, stabilized against rancidity by 3-benzyl mercaptopropionic acid.

12. A process which comprises protecting against rancidity a member of the group consisting of edible vegetable, animal, and fish oils, fats, and waxes, by incorporating therein a compound selected from the group consisting of sulfur- and oxygenated hydrocarbon-substituted beta mercaptopropionic acids and their esters.

13. A process which comprises protecting against rancidity a member of the group consisting of edible vegetable, animal, and fish oils, fats, and waxes, by incorporating therein a 4,7-dithiasebacic acid.

14. A member of the group consisting of edible vegetable, animal, and fish oils, fats, and waxes, stabilized against rancidity by 4,7-dithiasebacic acid.

15. Lard fortified against rancidity by from 0.1 to 1% 4,7-dithiasebacic acid.

16. Lard fortified against rancidity by from 0.1 to 1% 3-benzyl mercaptopropionic acid.

17. Lard fortified against rancidity by from 0.1 to 1% 3-lauryl mercaptopropionic acid.

MYERS F. GRIBBINS.
FREDERICK W. MILLER, JR.
DANIEL K. O'LEARY.